United States Patent
Epstein et al.

(10) Patent No.: US 9,437,189 B2
(45) Date of Patent: Sep. 6, 2016

(54) GENERATING LANGUAGE MODELS

(71) Applicant: Google Inc., Mountain View, CA (US)

(72) Inventors: Mark Edward Epstein, Katonah, NY (US); Lucy Vasserman, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/290,090

(22) Filed: May 29, 2014

(65) Prior Publication Data

US 2015/0348541 A1    Dec. 3, 2015

(51) Int. Cl.
*G10L 15/00* (2013.01)
*G10L 15/183* (2013.01)
*G10L 15/06* (2013.01)
*G06F 9/44* (2006.01)
*G10L 15/18* (2013.01)

(52) U.S. Cl.
CPC .......... *G10L 15/183* (2013.01); *G10L 15/063* (2013.01); *G06F 8/10* (2013.01); *G10L 15/1815* (2013.01)

(58) Field of Classification Search
CPC ........ G10L 13/00–13/10; G10L 15/00–15/34; G10L 17/00–17/26; G10L 19/00–19/265; G10L 21/00–21/18; G10L 25/00–25/78
USPC ............... 704/200–278; 701/1–302; 717/104
See application file for complete search history.

(56) References Cited

U.S. PATENT DOCUMENTS

| | | | |
|---|---|---|---|
| 5,267,345 A | 11/1993 | Brown | |
| 5,835,893 A * | 11/1998 | Ushioda | G10L 15/18 704/10 |
| 5,987,404 A * | 11/1999 | Della Pietra et al. | 704/9 |
| 6,157,912 A | 12/2000 | Kneser | |
| 6,188,976 B1 | 2/2001 | Ramaswamy | |
| 6,311,152 B1 | 10/2001 | Bai | |
| 6,314,399 B1 | 11/2001 | Deligne et al. | |
| 6,347,297 B1 * | 2/2002 | Asghar et al. | 704/243 |
| 6,421,641 B1 * | 7/2002 | Huang et al. | 704/250 |
| 6,470,315 B1 * | 10/2002 | Netsch et al. | 704/256.5 |
| 6,711,541 B1 * | 3/2004 | Kuhn | G10L 15/063 704/242 |
| 6,912,499 B1 * | 6/2005 | Sabourin | G10L 15/187 704/243 |

(Continued)

OTHER PUBLICATIONS

Backoff hierarchical class n-gram language models: effectiveness to model unseen events in speech recognition—Imed Zitouni—IBM T.J. Watson Research Center, NY—Computer Speech and Language 21 (2007) 88-104.*

(Continued)

*Primary Examiner* — Francisco Aponte
(74) *Attorney, Agent, or Firm* — Fish & Richardson P.C.

(57) ABSTRACT

Methods, systems, and apparatus, including computer programs encoded on a computer storage medium, for generating language models. In some implementations, data is accessed that indicates a set of classes corresponding to a concept. A first language model is generated in which a first class represents the concept. A second language model is generated in which second classes represent the concept. Output of the first language model and the second language model is obtained, and the outputs are evaluated. A class from the set of classes is selected based on evaluating the output of the first language model and the output of the second language model. In some implementations, the first class and the second class are selected from a parse tree or other data that indicates relationships among the classes in the set of classes.

20 Claims, 5 Drawing Sheets

(56) References Cited

U.S. PATENT DOCUMENTS

| | | | |
|---|---|---|---|
| 6,996,519 B2* | 2/2006 | Franco et al. .................... 704/9 |
| 7,031,908 B1* | 4/2006 | Huang ................ G10L 15/1815 |
| | | | 704/9 |
| 7,035,789 B2 | 4/2006 | Abrego et al. |
| 7,124,080 B2 | 10/2006 | Chen |
| 7,143,035 B2* | 11/2006 | Dharanipragada et al. .. 704/244 |
| 7,275,033 B1 | 9/2007 | Zhao et al. |
| 7,340,396 B2* | 3/2008 | Thomson ................ G10L 15/07 |
| | | | 704/234 |
| 7,478,038 B2 | 1/2009 | Chelba |
| 7,584,102 B2* | 9/2009 | Hwang .................. G10L 15/18 |
| | | | 704/235 |
| 8,065,144 B1* | 11/2011 | Gillick .................. G10L 15/005 |
| | | | 704/243 |
| 8,135,578 B2 | 3/2012 | Hébert |
| 8,583,416 B2* | 11/2013 | Huang ................ G10L 15/1822 |
| | | | 704/251 |
| 8,606,581 B1* | 12/2013 | Quast ..................... G10L 15/32 |
| | | | 704/254 |
| 8,615,389 B1* | 12/2013 | Marcu ................ G06F 17/2715 |
| | | | 704/1 |
| 8,676,580 B2* | 3/2014 | Deshmukh et al. .......... 704/239 |
| 8,831,957 B2* | 9/2014 | Taubman .......... H04M 1/72572 |
| | | | 379/88.01 |
| 8,838,449 B2* | 9/2014 | Ju ........................... G10L 15/19 |
| | | | 704/254 |
| 8,935,163 B2* | 1/2015 | Huang .................... G10L 15/22 |
| | | | 704/231 |
| 8,972,260 B2* | 3/2015 | Weng ................... G10L 15/063 |
| | | | 379/88.01 |
| 9,159,315 B1* | 10/2015 | Mengibar ............. G10L 15/005 |
| 9,286,892 B2* | 3/2016 | Mengibar ............... G10L 15/18 |
| 2001/0051868 A1 | 12/2001 | Witschel |
| 2002/0123891 A1* | 9/2002 | Epstein ........................ 704/235 |
| 2003/0083863 A1 | 5/2003 | Ringger |
| 2004/0111253 A1 | 6/2004 | Luo et al. |
| 2004/0148154 A1 | 7/2004 | Acero |
| 2004/0148170 A1 | 7/2004 | Acero |
| 2005/0055209 A1* | 3/2005 | Epstein ............... G10L 15/1815 |
| | | | 704/255 |
| 2005/0137868 A1* | 6/2005 | Epstein et al. ................ 704/252 |
| 2005/0256715 A1* | 11/2005 | Okimoto et al. ............. 704/257 |
| 2007/0124147 A1* | 5/2007 | Gopinath et al. ............. 704/257 |
| 2008/0091427 A1* | 4/2008 | Olsen .................... G10L 15/197 |
| | | | 704/254 |
| 2009/0106023 A1 | 4/2009 | Miki |
| 2011/0082696 A1* | 4/2011 | Johnston et al. ............. 704/243 |
| 2012/0022873 A1* | 1/2012 | Ballinger ................ G10L 15/30 |
| | | | 704/275 |
| 2012/0197629 A1* | 8/2012 | Nakamura ............ G06F 17/289 |
| | | | 704/3 |
| 2012/0232885 A1* | 9/2012 | Barbosa et al. .................. 704/9 |
| 2012/0271631 A1* | 10/2012 | Weng et al. ................... 704/243 |
| 2012/0323557 A1* | 12/2012 | Koll ....................... G10L 15/183 |
| | | | 704/8 |
| 2013/0024403 A1 | 1/2013 | Chen |
| 2013/0031113 A1 | 1/2013 | Feng |
| 2014/0324434 A1* | 10/2014 | Vozila et al. ................. 704/257 |

OTHER PUBLICATIONS

Backoff hierarchical class n-gram language models: effectiveness to model unseen events in speech recognition—Imed Zitouni—IBM T.J. Watson Research Center, Multilingual NLP, P.O. Box 218, 20-136, Yorktown Heights, NY 10598, USA—Feb. 2006.*

"Terminal and Nonterminal Symbols," Wikipedia, the free encyclopedia, last modified on Mar. 29, 2014, 3 pages downloaded from the internet on May 23, 2014 at: http://en.wikipedia.org/wiki/Nonterminal_symbol 5/.

"Brown clustering," Wikipedia, the free encyclopedia, last modified on Jul. 30, 2015 [retrieved on Sep. 8, 2015]. Retrieved from the Internet: URL<https://en.wikipedia.org/wiki/Brown_clustering>, 2 pages.

Brown et al., "Class-Based n-gram Models of Natural Language," Association for Computational Linguistics, 18(4):467-479, Dec. 1992.

Chen et al., "Scaling Shrinkage-Based Language Models," Automatic Speech Recognition and Understanding (ASRU) 2009, pp. 299-304, 2009.

Gao et al, "The Use of Clustering Techniques for Language Modeling—Application to Asian Languages," Computational Linguistics and Chinese Language Processing, 6(1):27-60, Feb. 2001.

* cited by examiner

```
                              200
        ┌─────────────────────────────────────────────────┐
202  LOCATION        = CITY | STATE | CITY STATE | AIRPORT | ...;
204  CITY            = new york | los angeles | ....;
     STATE           = STATE_CODE | STATE_NAME | STATE_ABBREV;
     STATE_CODE      = al | ak | ... wy;
     STATE_NAME      = alabama | alaska | ... | wyoming;
     STATE_ABBREV    = bama | mass | cali | ...;
     AIRPORT         = AIRPORT_NAME | AIRPORT_CODE;
     AIRPORT_NAME    = John F Kennedy | LaGuardia | Los Angeles International | ... ;
     AIRPORT_CODE    = JFK | LGA | LAX | ... ;
```

FIG. 2A

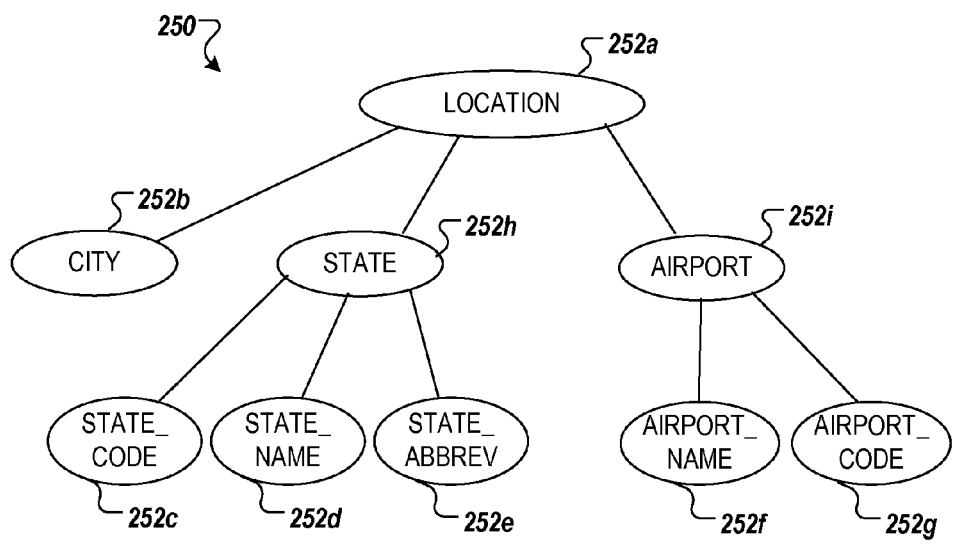

FIG. 2B

Training Data

...

302a → I want to fly to [California]{Location}

302b → concert tickets

302c → bus to [new york]{Location}

302d → movies playing at [3 pm]{Time}

302e → show flights from [Boston Mass]{Location} to [LAX]{Location}

GENERATING LANGUAGE MODELS

FIELD

This disclosure relates to generating language models.

BACKGROUND

Speech recognition systems typically aim to convert a voice input from a user into a natural language transcription. Speech recognition systems may use a language model in the process of determining the words that a user has spoken. For example, a language model may include statistical information about language that can be used to estimate which words are likely to occur in a language sequence.

SUMMARY

A language model may use classes to represent words corresponding to one or more semantic concepts. When generating a language model, the classes to be modeled may be selected based on comparing language models that use different sets of classes. A concept, such as time or location, may be expressed using different levels of granularity, and different classes may correspond to the different levels of granularity. For example, the concept of location may be modeled as a top-level class that includes all forms of expressing a location. Alternatively, the concept of location may be modeled as more specific classes that represent country names or city names, respectively. The various classes that may represent a concept may be organized into a hierarchy, such as a tree or a set of grammars. In some instances, the accuracy of a language model may be enhanced by modeling a concept using an intermediate class in the hierarchy, rather than the broadest class or narrowest class.

To determine which class or classes should be used to express a concept, a system can train multiple language models that use different classes from the concept's class hierarchy. The classes that are selected for use in a language model can be selected based on evaluating and comparing the various language models that use different classes. For example, a word error rate score or perplexity score may be calculated for each of the trained language models, and the language model(s) that have the lowest word error rate or lowest perplexity may be identified. The identified language models may then be used, for example, in speech recognition, or the classes corresponding to the identified models may be selected to train another language model.

The sets of classes to be evaluated may be selected from a parse tree that indicates relationships among the various classes that may be used to express a concept. For example, different levels or portions of the parse tree may be evaluated separately to assess the performance of alternative ways of modeling the concept. Once a parse tree has been generated, all sets of classes along the parse tree may be identified and tested.

In a general aspect, a method includes: accessing data indicating a set of classes corresponding to a concept, each of the classes representing a different set of words or phrases associated with the concept; generating a first language model in which a first class from the set of classes represents the concept; generating a second language model in which second classes from the set of classes represent the concept, each of the second classes being different from the first class; obtaining (i) output of the first language model for a set of input data, and (ii) output of the second language model for the set of input data; evaluating the output of the first language model and the output of the second language model; and selecting one or more classes from among the set of classes based on evaluating the output of the first language model and the output of the second language model.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, generating the first language model may include generating the first language model using the first class to represent the concept and without using any of the second classes to represent the concept, and generating the second language model may include generating the second language model using the second classes to represent the concept and without using the first class to represent the concept. The actions include receiving audio data corresponding to an utterance; and based on selecting the one or more classes from the set of classes, using a language model in which the selected one or more classes represent the concept to determine a transcription for the utterance. Selecting the one or more classes from the set of classes based on evaluating the output of the first language model and the output of the second language model may include selecting the first class; and using a language model in which the selected one or more classes represent the concept to determine a transcription for the utterance may include using the first language model to determine the transcription for the utterance. Selecting the one or more classes from the set of classes based on evaluating the output of the first language model and the output of the second language model may include selecting the first class and not selecting the second classes; and using a language model in which the selected one or more classes represent the concept to determine a transcription for the utterance may include using the first language model to determine the transcription for the utterance and not using the second language model to determine the transcription for the utterance. Selecting the one or more classes from the set of classes based on evaluating the output of the first language model and the output of the second language model may include selecting the first class. The actions include, based on selecting the first class, generating a third language model in which the first class from the set of classes represents the concept; and using a language model in which the selected one or more classes represents the concept to determine a transcription for the utterance may include using the third language model to determine the transcription.

Implementations may include one or more of the following features. For example, evaluating the output of the first language model and the output of the second language model includes: determining a first score based on the output of the first language model; determining a second score based on the output of the second language model; and comparing the first score and the second score. Determining the first score may include determining a score that indicates a word error rate of the first language model, and determining the second score may include determining a score that indicates a word error rate of the second language model.

Determining the first score my include determining a score that indicates a perplexity of the first language model, and determining the second score may include determining a score that indicates a perplexity of the second language model.

Implementations may include one or more of the following features. For example, accessing data indicating the set of classes corresponding to the concept may include accessing data indicating a hierarchy of classes corresponding to the concept, where at least some of the classes in the hierarchy represent different forms of expressing at least a portion of the concept. The hierarchy may include a top-level class, one or more lowest-level classes, and one or more intermediate classes located between the top-level class and the one or more lowest-level classes. Selecting one or more classes from the set of classes may include selecting one or more of the intermediate classes. The actions may include using a language model in which the selected one or more intermediate classes are used to represent the concept to determine a transcription for one or more utterances. The first class and the second classes may be located at different levels of the hierarchy, and the second classes may be sub-classes of the first class. The actions may include generating, for each additional set of classes in the hierarchy that represents the concept other than the first class and the second classes, an additional language model in which the additional set of classes represents the concept; obtaining output of each of the additional language models for the set of input data; and evaluating the output of each of the additional language models. Selecting one or more classes from the set of classes based on evaluating the output of the first language model and the output of the second language model may include selecting one or more of the classes in the hierarchy of classes based on evaluating the output of the first language model and the output of the second language model and based on evaluating the output of each of the additional language models.

Advantageous implementations can include one or more of the following features. The classes to be used in a class-based language model may be determined empirically, for example, through an automated or semi-automated process. The effects of using various different combinations and permutations of classes in a language model can be determined. An appropriate level of granularity at which to model a concept can be identified. Evaluation of different language models can provide quantitative measures that indicate which classes to select. Language models that are generated may exhibit enhanced accuracy in various language tasks, such as providing transcriptions through automatic speech recognition.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 2A is a diagram that illustrates an example of grammars representing a concept as various classes.

FIG. 2B is a diagram that illustrates an example of a parse tree representing a concept as various classes.

FIG. 3 is a diagram that illustrates an example of data that may be used to generate a language model.

Like reference numbers and designations in the various drawings indicate like elements.

DETAILED DESCRIPTION

Figure 1:
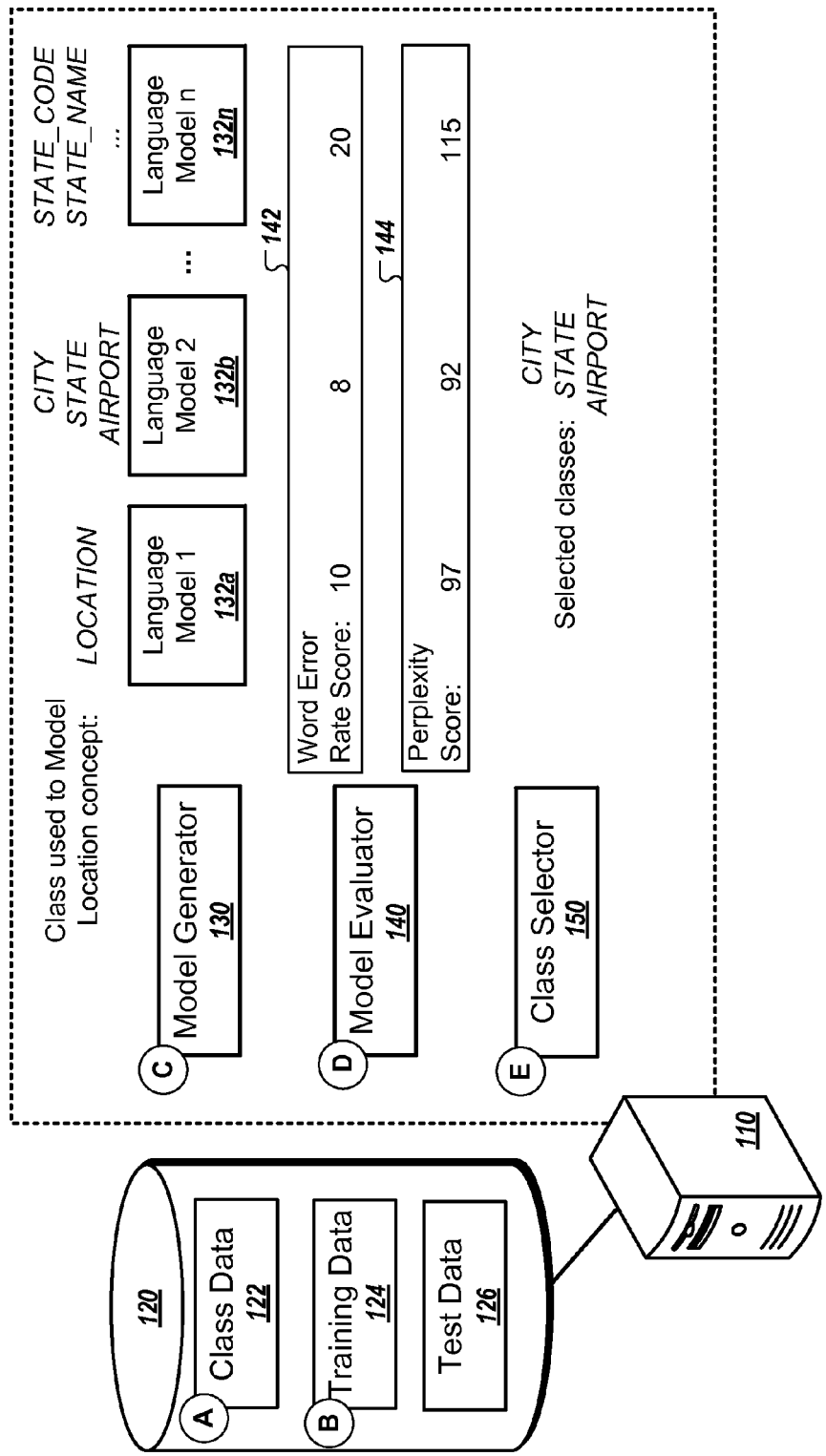
FIG. 1 is a diagram that illustrates an example of a system for generating language models.

FIG. 1 is a diagram that illustrates an example of a system 100 for generating language models. The system 100 includes a computing system 110, which may include one or more computers, and one or more data storage devices 120. The computing system 110 includes various modules, such as a model generator 130, a model evaluator 140, and a class selector 150. These modules may be implemented in hardware, software, or a combination of hardware and software. In the example, the computing system 110 accesses data about classes that correspond to concepts, trains language models using different classes, and evaluates the performance of the different language models. Based on the evaluation of the language models, the computing system 110 determines which classes should be used to model various concepts. FIG. 1 shows stages (A) to (E) which illustrate a flow of data.

Some language models use classes to represent sets of words and/or phrases. These language models may be referred to generally as class-based language models. A class can act as a symbol or placeholder that may represent any member of the class. For example, a CITY_NAME class may represent any one of a set of city names. When a language model is generated using this class, the language model may be trained to predict the likelihood that an instance of the CITY_NAME class will occur in a language sequence. Given a particular linguistic context, such as the phrase "I want to fly to," the language model may determine that it is likely that the next word is a city name, resulting in the sequence, "I want to fly to <CITY_NAME>." Then, the language model may use, in place of the symbol <CITY_NAME>, a city selected from the list of city names associated with the class to complete the sequence.

Modeling with classes can provide versatility to a language model. For example, it is unlikely that a given set of training data includes every city name in every possible context that a city name could occur. Modeling every city name individually could potentially limit the performance of a model, since a user may later speak a particular city name in a context that was not observed in training data. However, when using a class to represent city names as a group, all instances of city names in the training data may be used to show how city names are typically used. In general, among other potential benefits, training a language model using classes may enhance robustness in recognizing language combinations that did not occur in training data.

There are often many different classes that may be used to represent a concept. The selection of classes to be used is generally fixed at the time a language model is trained. When a concept may be expressed in different classes, for example, at multiple levels of granularity or detail, it may be difficult to predict which classes would provide the best performance. For example, to represent the concept of location, a decision may need to be made whether to use (i) a top-level class, such as a LOCATION class that encompasses all location formats, (ii) lowest-level classes, such as a ZIP_CODE class and STREET_ADDRESS class, or (iii) intermediate-level classes, such as a CITY class and STATE class, or a combination of classes across multiple levels of granularity. In some instances, the choice of which classes to use in a language model can significantly the accuracy of a language model.

To determine which classes to use in a language model, the computing system 110 may generate a variety of language models, with each of the language models using a different set of classes. The computing system 110 can compare the performance of the language models, and identify the language model(s) that have the best performance. The set of identified language models may then be used to complete any of various language modeling tasks, such as determining a transcription for an utterance. In addition, or as an alternative, the classes that were used by the best-performing language models may then be used to generate other language models, for example, models for use in a commercial system providing output to users, or language models that the computing system 110 generates to test additional combinations of classes.

The process of generating and evaluating different classes may be enhanced using hierarchy of classes for a concept. For example, the computing system 110 can access a tree showing relationships among classes that represent sub-concepts or variations of a concept. The computing system 110 may generate language models that each use a different class or set of classes from the tree, allowing experiments to be run using classes at any or all levels of the tree. For each top-level concept, it is possible a priori to determine all possible nodes that can span any phrase using a hand-generated grammar. One can then build a language model at each level granularity, and determine which works best using informational theoretic measurements like cross-perplexity or empirical methods like word error rate of a speech recognition system. Each permutation or variation of a concept can be tested with a different language model. Similarly, the computing system 110 may generate language models that use different combinations of multiple classes within the tree. The computing system 110 may also generate language models with varying sets of classes from concept trees for different overall concepts, for example, by varying the classes selected to represent times, while also varying the classes selected to represent locations. In this manner the computing system 110 may be configured to automatically generate and evaluate language models that use different sets of classes. The computing system 110 can automatically select the language models and sets of classes that meet a set of predetermined criteria.

In some implementations, data is accessed that indicates a set of classes corresponding to a concept. Each of the classes may represent a different set of words or phrases associated with the concept. A first language model is generated in which a first class from the set of classes represents the concept. A second language model is generated in which second classes from the set of classes represent the concept. Output for the first language model is obtained for a set of input data, and output is obtained from the second language model for the set of input data. The output of the first language model and the output of the second language model are evaluated, and one or more classes are selected from the set of classes based on the evaluation.

Still referring to FIG. 1, in stage (A), the computing system 110 accesses class data 122 that indicates classes corresponding to a concept. A semantic concept, such as location or time, may be expressed as a hierarchy of classes, such as a set of grammars or a tree. The class data 122 may indicate different levels of granularity of the concept, for example, using classes that specify different levels of detail or represent various alternative formats for expressing the concept. Examples of class data 122 are shown in FIGS. 2A and 2B.

FIG. 2A is a diagram that illustrates an example of grammars 200 representing a concept as various classes. In the example, the set of grammars represents the concept of location. A top-level class, LOCATION, is defined to include instances of any of various other classes that represent sub-concepts or sets of words related to location. For example, the LOCATION class may be an instance of any of a CITY class, a STATE class, or an AIRPORT class, as indicated by their respective class symbols in the grammar 202. Each of these classes, in turn, represents a different type of word or a different format in which a location may be expressed. In addition, the LOCATION class may include combinations of classes occurring together, such as CITY STATE, which indicates that a combination of words from each class, e.g., "San Francisco, Calif.," may represent a single location. The classes are each associated with a list of words and/or phrases that are members of the class. For example, the CITY class is defined to represent an instance of any of the cities listed in the grammar 204, e.g., "new York," "los angeles," and so on. As a result, the words associated with the CITY class are a proper subset of the words encompassed by the LOCATION class.

FIG. 2B is a diagram that illustrates an example of a parse tree 250 representing a concept as various classes. The parse tree 250 includes nodes that correspond to the classes defined by the grammars of FIG. 2A. The highest-level class, LOCATION, corresponds to the node 252a, and parse tree 250 also includes terminal classes or lowest-level classes CITY, STATE_CODE, STATE_NAME, STATE_ABBREV, AIRPORT_NAME, and AIRPORT_CODE, which correspond to nodes 252b-252b respectively. A set of intermediate classes, e.g., STATE and AIRPORT, correspond to nodes 252h, 252i.

Referring again to FIG. 1, in stage (B), the computing system 110 accesses and processes training data 124 for use in training language models. In some implementations, the type of data used as training data 124 can correspond to the type of input data that the language model will be used to evaluate. For example, when training a language model that will be used to recognize voice queries, the training data 124 may be the text of voice queries that users have previously submitted. Nevertheless, any appropriate textual source may be used, including, web pages, books, and other examples of language usage.

The training data 124 can be processed to identify words and phrases corresponding to different semantic concepts. For example, the computing system 110 may assign labels that indicate which words or phrases in the training data represent a location, which words or phrases represent a time, which words or phrases represent a date, and so on. As an example, a sentence that includes a name of a month, or a name of a day, or an ordinal number in an appropriate range, e.g., $1^{st}$ to $31^{st}$, may be labeled as an instance of a date in the training data 124. The computing system 110 may access data indicating formats of locations, dates, times, and other concepts of interest. In some instances, some or all of the class data 122 may be used to label the training data, for example, by matching words or phrases associated with the classes to words or phrases in the training data. Grammars representing common language patterns may additionally or alternatively be used to identify instances of different concepts from context. In some implementations, some or all of the training data 124 may be labeled by human raters. In some implementations, examples labeled by human raters may be used as seed data to generate a statistical model. The seed data may limit the degrees of freedom for a machine learning algorithm that trains the model, and the model can then be used to label a set of data. An example of training data 124 and labeling of the training data is shown in FIG. 3.

FIG. 3 is a diagram that illustrates an example of training data 300 that may be used to generate a language model. The training data 300 includes queries 302a-302e that were previously submitted, and the computing system 110 has labeled various portions of the queries 302a-302e with the semantic concepts, e.g., location and time, that these portions express. In some implementations, the computing system 110 may identify instances of a single concept that is of interest, and in other implementations the computing system 110 identifies instances of multiple different concepts. The computing system 110 may additionally determine a class tree for individual examples in the training data 300, to identify the classes corresponding to labeled portions of the training data.

Figure 4:
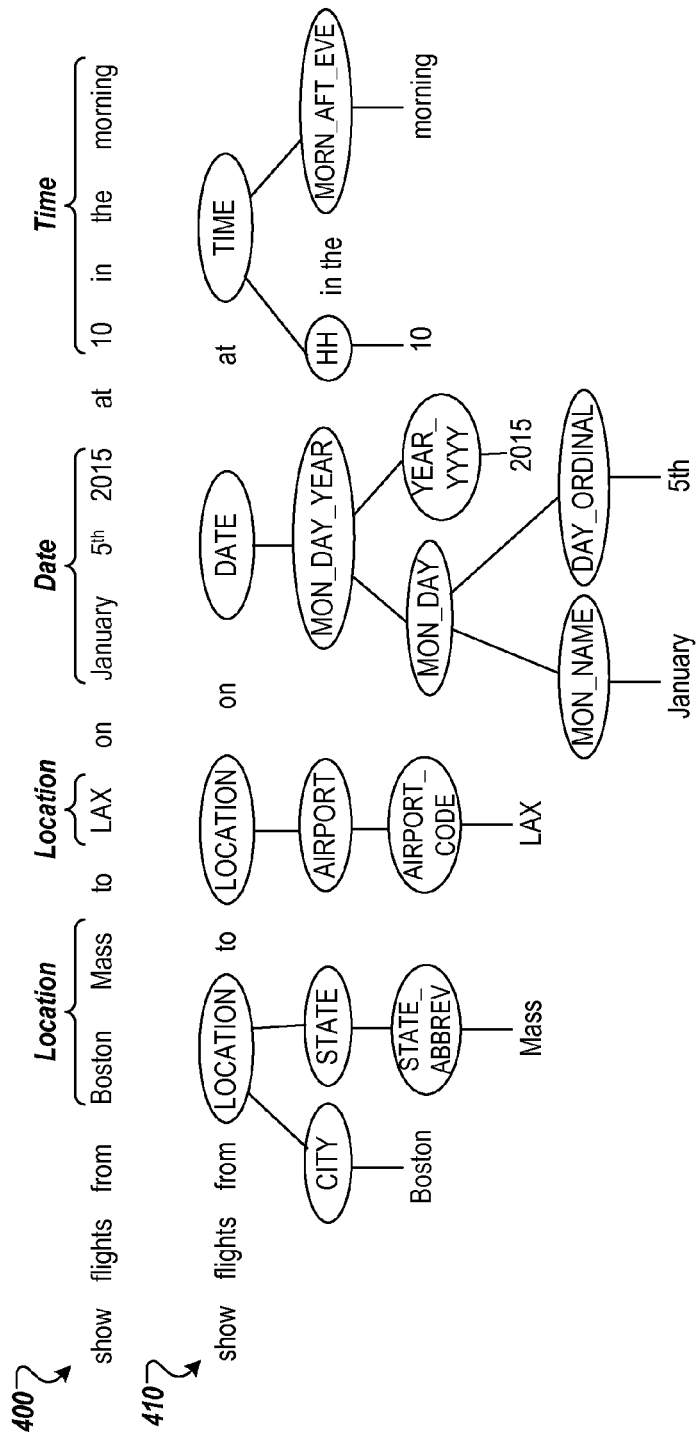
FIG. 4 is a diagram that illustrates an example of analysis of a language sequence.

FIG. 4 is a diagram that illustrates an example of analysis of a language sequence 400. A tree 410 has been generated for the language sequence 400 by inserting into the language sequence 400 portions of concept trees, like the parse tree 250 of FIG. 2B, that describe aspects of the language sequence 400. The class tree 410 can indicate the various different classes that can be substituted for the words of the language sequence 400. For example, the words "Boston Mass" may be replaced with a symbol for the LOCATION class. Alternatively, the same words may be replaced by symbols for the CITY class and STATE class. In this manner, the class tree 410 can indicate all of the different levels of granularity that the concepts in the language sequence 400 can be expressed, from the highest-level class, e.g., LOCATION, to the lowest-level classes, e.g., STATE_ABBREV, or at any intermediate level.

To determine the class tree 110, the computing system 110 may identify matches between words in the language sequence 400 and the sets of words associated with different classes. For example, the computing system 110 may determine that the abbreviation "Mass" is a member of the STATE_ABBREV class, and then traverse the parse tree 250 of FIG. 2B up to the top-level class, LOCATION. All classes in the traversed path may be included in the class tree 410. Other techniques may alternatively be used to build the class tree 410. The class tree 410 is illustrated as a tree structure for clarity, but the information represented by class trees may be manipulated and stored as grammars, tables, lists, indexes, or any other appropriate data structure.

The computing system 110 may also identify subsets of training data corresponding to particular concepts or classes. For example, the computing system 110 may identify a subset of the training data 300 in which each query has been labeled as including an instance of the location concept, e.g., a subset that includes queries 302a, 302c, and 302e. The result is a set of data where each example has an expression of the concept. As another example, the computing system 110 may use class trees for different queries to identify a subset of queries that each include the CITY class in its class tree. Different subsets of training data can be identified for each of the different classes in the parse tree 250, and for each of the classes in different concepts.

Referring again to FIG. 1, in stage (C), the model generator 130 of the computing system 110 uses the training data 124 to generate multiple language models 132a-132n. As discussed further below, the computing system 110 uses these multiple language models 132a-132n to determine which classes associated with a concept should be used to model the concept.

Each of the language models 132a-132n uses a different set of classes. For example, to assess which classes are most appropriate for modeling the concept of location, each of the language models 132a-132n may model the concept of location using a different set of classes from the parse tree 250 in FIG. 2B. The language model 132a, for example, models the concept of location using the highest-level class, LOCATION, and does not use the other classes in the parse tree 250. The language model 132a, for example, models the concept of location using the CITY class, the STATE class, and the AIRPORT class, but not the other classes in the parse tree 250. As a result, the language models 132a-132n are each trained to model locations expressed in a different format or at a different level of granularity or specificity.

In some implementations, a different language model is trained for each individual class in the parse tree 250. Other language models may be trained using combinations of classes that together represent an instance of the concept, such as the combination CITY STATE that represents a single location. In some implementations, multiple alternative classes may be used together. For example, a language model may model the likelihood of the LOCATION class as well as the likelihood of the CITY class. Any appropriate variation in the set of classes, including different combinations and sub-combinations of classes can be used. As additional examples, language models may be generated that use the all the classes at a particular level of the parse tree 250, for example, one language model using the highest-level class, another language model using all of the classes one level below the highest-level class, and another using the classes two levels below the highest-level class.

The language models 132a-132n may use any appropriate amount of context to generate likelihood scores. The language models 132a-132n may use a previous word, two previous words, or another amount of context to estimate the likelihood of occurrence of the next word in the sequence. Each of the language models 132a-132n is trained to estimate the likelihood of occurrence of its corresponding classes based on the context of previous words in the sequence. A symbol for the class represents an occurrence of any member of the class. For example, the language model 132a may be trained to estimate the likelihood of occurrence of a <LOCATION> symbol, where the symbol represents any word associated with the LOCATION class. Similarly, the language model 132b can be trained to estimate the likelihood of occurrence of a <CITY> symbol, a <STATE> symbol, and an <AIRPORT> symbol, where each of the symbols represents any word in the associated class. Each of the language models 132a-132n may be trained to also estimate likelihoods of a variety of words as well as classes corresponding to other concepts, besides the class or classes used to model the concept of location.

During training, each of the language models 132a-132n may be trained using subsets of the training data 124. In particular, the data used a train a particular model can be selected to include sufficient examples in which the class symbol that the model will be trained to predict, e.g., <LOCATION> or <CITY>, occurs in a variety of contexts. Different subsets of the training data 124 may be used to train different language models 132a-132b. In some implementations, each of the examples used to train a language model includes at least one of the class symbols the model will be trained to predict. In other implementations, a model may be trained using examples that include the class symbol and with other examples that do not include the class symbol.

Using class trees for the training data, the computing system 110 can substitute different classes for the words in the training data. For example, to train the language model 132*a*, which uses the LOCATION class, the language sequence 400 of FIG. 4 may be represented as "show flights from <LOCATION> to <LOCATION> on <DATE> at <TIME>." To train the language model 132*b*, which uses the CITY class, the language sequence 400 may be represented as "show flights from <CITY> Mass to LAX on <DATE> at <TIME>." Training a language model using CITY and STATE together to represent a location, the language sequence 400 may be represented as "show flights from <CITY> <STATE> to LAX on <DATE> at <TIME>." In this manner, the same language sequence 400 may be used as a training example for any of the different classes in the class tree 410, with the symbols used in the substitution corresponding to the classes used by the language model being trained.

In some implementations, the language models 132*a*-132*n* are each assigned combinations of class symbols that will encompass each of the words at the lowest-level of the class trees. For example, when modeling the concept of a calendar date, one model may be assigned to model the concept using the symbol <DATE> for the highest level class, and another language model may be assigned the symbol sequence <MONTH> <DAY> <YEAR>. Either of these sets of sets of symbols may be mapped directly to a date example such as "January 26, 2015," without any portion of the example being unassigned to a class. However, a language model may not be trained using only the class symbols <MONTH> <DAY>, because this symbol set would not encompass the year in the date expression, and thus would not allow a full mapping to the words of the "January 26, 2015" date expression.

In stage (D), the model evaluator 140 of the computing system 110 evaluates the language models 132*a*-132*n*. The model evaluator 140 inputs test data 126 to each of the language models 132*a*-132*n*, and receives output from each of the language models 132*a*-132*n*. The outputs of the language models 132*a*-132*n* can indicate, for example, likelihoods that the models assign for the next word in a sequence of words, or likelihoods that a sequence of words would occur. The language models 132*a*-132*n* may indicate likelihoods that their respective classes corresponding to the concept of location will occur, as well as likelihoods that other words and other classes will occur.

As part of the evaluation, the model evaluator 140 generates scores or other measures that indicate performance characteristics of the language models 132*a*-132*n*. In some implementations, the model evaluator 140 determines a word error rate score 142 for each of the language models 132*a*-132*n*. Some or all of the test data 126 may be recordings of utterances, and the input to the language models 132*a*-132*n* may be data from initial processing of the recordings by a speech recognition system. Transcriptions of the utterances can be obtained, for example, by human transcription or human labeling or verification of a transcription, so that the ground truth about the actual content of the utterances is known. The output of the language models 132*a*-132*n* can be compared to the known transcriptions for the utterances to determine word error rates.

As another example, the model evaluator 140 may determine cross-perplexity scores 144 for the language models 132*a*-132*n*. The test data 126 may include examples of language for which instances of certain semantic classes have been identified. Given various language sequences as input, the model evaluator 140 may determine how well each of the language models 132*a*-132*n* represents the test data 126. For example, the perplexity scores 144 may indicate, that given a set of valid language sequences, to what extent does a model predict these sequences to occur. Generally, perplexity is correlated with word error rate. To determine perplexity, the ground truth about the accuracy of a transcription may not be needed, and text transcriptions may be used for testing without underlying audio recordings. As a result, perplexity measurements may be made without needing a full speech recognition pipeline.

The model evaluator 140 compares the scores for the various language models 132*a*-132*n*. For example, the model evaluator 140 may compare the word error rate scores 142 of the different language models 132*a*-132*n* to each other to determine which language model 132*a*-132*n* has the lowest error rate. In addition, or as an alternative, the word error rate scores 142 may be compared or to a baseline or threshold score, which may indicate whether use of one set of classes or another improves on the baseline performance of another language model. In the same manner, the model evaluator 140 may compare perplexity scores 144 of different language models 132*a*-132*a* to each other or to a baseline. Generally, a lower level of perplexity corresponds to a better predictive ability.

In some implementations, the same set of test data 126 is used to test each of the language models 132*a*-132*n*, and in other implementations, the test data sets may not be the same. The language sequences used as the test data 126 may be language sequences separate from those used as training data 124, or may be taken from the training data 124. The test data 126 may include, in whole or in part, language sequences of the of a target application, for example, voice query recordings or voice query transcriptions may be used where the computing system 110 is assessing performance for use in recognizing voice queries.

In stage (E), the class selector 150 of the computing system 110 selects one or more classes to use in representing the concept. The class selector 150 may identify, for example, the language model 132*a*-132*n* that has the best performance, e.g., the language model with the lowest word error rate, or the lowest perplexity. In some instances, the class selector 150 may identify the best performing language model 132*a*-132*n* based on both perplexity and word error rate. In the example, the scores 142, 144 indicate that the language model 132*b* has the lowest word error rate and the lowest perplexity, and thus has the best performance. As a result, the class selector 150 selects the class or classes that this language model 132*b* uses to represent the location concept, e.g., the CITY, STATE, and AIRPORT classes, as the best representation of the location concept. Based on the selection of these classes, the language model 132*b* may be used in to determine transcriptions for utterances of users. In addition, or as an alternative, another language model may be generated with the CITY, STATE, and AIRPORT classes representing locations.

When multiple classes are used together to represent a concept, the class selector 150 may select all of the classes used. For example, if location is modeled as a CITY class followed by the STATE class, both classes may be used, with the sequence "<CITY> <STATE>" being selected to represent a single instance of the location concept.

In the example of FIG. 1, once the full parse tree 250 for the location concept is known, the computing system 110 may conduct experiments with classes at any single level of the parse tree 250, or any combination of levels of the parse tree 250, or using combinations of classes that span multiple levels of the parse tree 250.

In addition to experimenting with which classes are selected to model a concept, the order of the classes and other parameters may be varied as well. For example, to capture the differences between expressing a date as "January $5^{th}$" or "$5^{th}$ of January", one language model may model a date as a "<MONTH_NAME> <DAY_ORDINAL>" and another language model may model a date as "<DAY_ORIDINAL> of <MONTH_NAME>."

In some implementations, the computing system 110 generates and tests language models using different combinations of classes corresponding to multiple different concepts. For example, there may be multiple options to represent dates, times, and other concepts, in addition to the various options for representing locations. Each of the possible combinations of the various date, time, and location options may be tested with a separate language model. For example, if there are 4 options for representing the location concept, three options for representing dates, and 4 options for representing times, then a total of 4×3×4=48 language models may be generated to test each permutation of the various formats.

To reduce the number of models to be trained and evaluated, one concept's classes may be optimized at a time, through various rounds of processing. A greedy algorithm may be used. For example, the computing system 110 may initially identify the concept that has the least number of variations, and test the different variations of this concept, while the other concepts may be fixed at their highest-level classes. For example, if the expression of a time of day had the fewest variations, a set of language models would be generated in which the each model used a different format to express time of day, but used the same, highest-level classes to represent location and time. The evaluation process would indicate which form of expressing time of day produced the best results. Then, in an additional round of processing, a new set of language models would be generated, in which each language model used the best-performing time format and the highest-level location format, but the date format varies from one model to the next. Similar rounds of processing would continue for each concept for which the class selection should be optimized. In this manner, the best classes to represent each concept may be determined one by one, by repeating the processing of stages (C) to (E) with variations of a concept being tested each time.

After classes have been determined for each concept, the process may be repeated to re-assess the original class selections. For example, after determining classes for time, date, and location, processing may be done to reevaluate variations of time formats, using the selected date and location classes instead of the highest-level classes used initially. The process may proceed until a certain number of iterations has been reached, or a predetermined level of performance is achieved, or when another condition is reached.

In some implementations, evaluation of the language models 132a-132n may indicate particular contexts in which one set of classes provides better results than others. Based on this information, language models can be configured to use different classes to represent a concept depending on which linguistic context occurs. For example, in the language sequence "I want to fly to <LOCATION>," an instance of the general LOCATION class may be appropriate. However, in another sequence, such as "I want to fly to <LOCATION> in <LOCATION>," the use of the general LOCATION class may not be appropriate, since some combinations of locations may not make sense. For example, although a country and city are each locations, it would not be valid to say a "California in San Francisco." Rather, the language model may be configured to recognize that, in the language pattern of a location in another location, the broader LOCATION class should be replaced with, e.g., "<AIRPORT> in <CITY>," "CITY in STATE," or "STATE in COUNTRY."

Multiple test data sets may be used to test the language models 132a-132n, where each test data set includes examples of a different type of context. The language model and associated class that provide the best performance for each test data set may be selected. From these results, the computing system 110 may generate a set of rules that indicate which classes should be used in which contexts. As an example, at the time of generation of the language model, a decision may be made to use a certain set of classes when a particular context occurs. During use of the language model in speech recognition, the speech recognition system may determine that the context, e.g., input sequence, matches a predetermined context. In response the speech recognition system selects the classes previously selected to be used with the identified context. Various other rules may be determined. For example, if a language sequence includes one instance of location, the highest-level class, LOCATION, should be used. If a language sequence includes two instances of locations, a lower-level class should be used.

Figure 5:
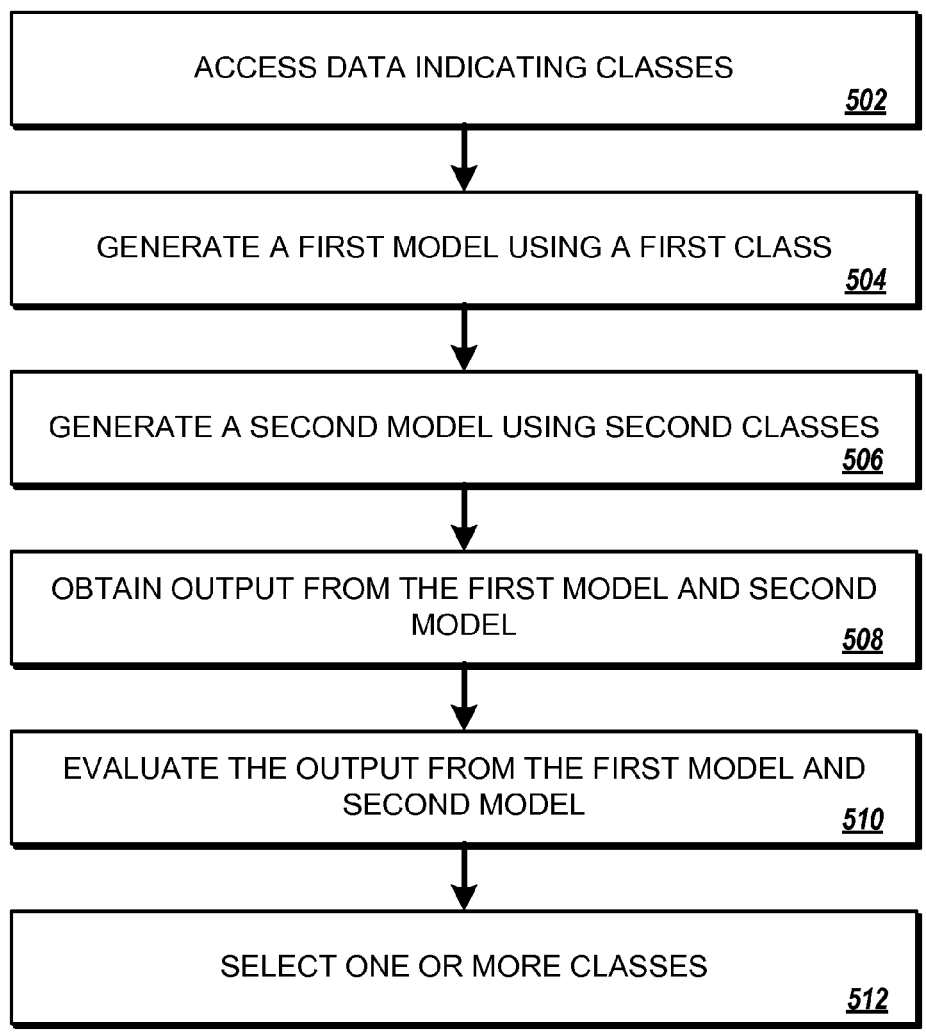
FIG. 5 is a flow diagram illustrating an example of a process for generating language models.

FIG. 5 is a flow diagram illustrating an example of a process 500 for generating language models. The process 500 may be performed by a computing system including one or more computing devices, for example, the computing system 110 of FIG. 1.

The computing system accessed data indicating a set of classes corresponding to a concept (502). Each of the classes may represent a different set of words or phrases associated with the concept. The accessed data may indicate a hierarchy of classes corresponding to the concept. For example, the accessed data may include a tree of classes, such as the parse tree 250 shown in FIG. 2B, or a set of grammars indicating relationships among classes. At least some of the classes in the hierarchy may represent different forms of expressing the concept. The highest-level class may correspond to a first set of words, where the words may belong to any of the other classes in the hierarchy. Other classes in the hierarchy may correspond to subsets of the first set. Some classes may correspond to disjoint subsets of the first set. For example, a top-level class for location may represent any word that is a city name, country name, state name, or other form of indicating location. However, a city name class and a state name class may each represent disjoint subsets of words that correspond only to city names and state names, respectively.

The computing system generates a first language model in which a first class from the set of classes represents the concept (504). The computing system generates a second language model in which second classes from the set of classes represent the concept (506). The second class is different from the first class. The first class and the second classes can be selected from a hierarchy such as the parse tree 250. For example, the first class may be a particular node of the parse tree 250, and the second classes may be a set of child nodes beneath the particular node. The first language model may use the first class to represent the concept, without using the second classes to represent the concept. Similarly, the second language model may use the second classes to represent the concept without using the first class to represent the concept. As an example, to represent the concept of location, the first language model may use a general location class without using more specific classes. The second language model may use classes that respectively correspond to city names, airport names, and state names without using the general location class.

In some instances, the first class and the second classes are located at different levels of the hierarchy. The second classes may each be a sub-class of the first class, for example, the second classes may correspond to nodes directly below or multiple levels below the first class. In some instances, the first class and the second classes may be located at a same level of the hierarchy.

In some instances, a single class may represent a concept. In other instances, multiple classes together may represent a concept. For example, the classes for city names and state names may be used together to represent the concept of location, since a city name and state name may occur together to indicate a single location. In this instance, the city name class and state name class may each partially represent the overall concept of location. Additionally, in some instances, a language model may be trained to use multiple alternative classes or sets of classes to represent the same concept, resulting in each alternative representing a portion of the overall concept.

The computing system obtains output of the first language model for a set of input data, and also obtains output of the second language model for the set of input data (508). Various linguistic contexts, such as word sequences, may be provided to the models. Estimates or likelihood scores may be received from the models, representing likelihoods, indicated by the models, that certain words or class symbols will occur in the linguistic contexts that were provided.

The computing system evaluates the output of the first language model and the output of the second language model (510). The computing system may determine a first score based on the output of the first language model, determine a second score based on the output of the second language model, and compare the first score and the second score. For example, the scores may be word error rate scores determined for the respective language models. As another example, the scores may be perplexity scores determined for the respective language models. In some implementations, the scores may be compared to one or more thresholds.

The computing system selects one or more classes from the set of classes based on evaluating the output of the first language model and the output of the second language model (512). For example, the result of comparing scores indicating performance characteristics of the language models may be used to determine which classes are likely to provide the best performance in modeling the concept. The selected classes may be used in training of additional language models for recognizing utterances of users.

In some implementations, a single class, or a set of the classes corresponding to a single language model, may be selected to model the concept. In some implementations, multiple classes used by different language models may be selected. For example, if both the first language model and the second language model have a level performance that satisfies a threshold, the first class and the second classes may both be selected.

In some implementations, the computing system receives audio data corresponding to an utterance. Based on the selection of a class, the computing system uses a language model to determine a transcription for the utterance, where the language model used is one in which the selected class to at least partially represents the concept. For example, if the first class is selected, the first language model to determine the transcription for the utterance. If the second classes are not selected, the second language model is not used to determine the transcription for the utterance. For example, based on the second classes not being selected, the second language model may be excluded from use to determine the transcription. In some implementations, if the first class is selected, the computing system generates a third language model in which the first class from the set of classes at least partially represents the concept. The third language model may be one that does not model the concept using the second class when the second class is not selected. The third language model may then be used to determine the transcription for the utterance. Of course, if the second classes are selected instead of the first class, then the third language model may use the second classes instead of the first class.

In some implementations, a hierarchy of classes includes a top-level class, one or more lowest-level classes, and one or more intermediate classes located between the top-level class and the one or more lowest-level classes. One or more of the intermediate classes may be selected and, in response, a language model in which the selected one or more intermediate classes at least partially represent the concept may be used to determine a transcription for one or more utterances. For example, there may be three or more levels of granularity in expressing the concept, and a decision may be made to model the concept at an intermediate level, rather than, or in addition to, using the broadest or narrowest classes in the hierarchy.

Language models may be generated and evaluated for additional classes corresponding to the concept. A different language model may be generated and tested for each different set of classes that may be used to represent a concept. For example, an additional language model may be generated for each additional class in the hierarchy other than the first class and the second class. Output of each of the additional language models may be obtained and evaluated. The class or classes used to model the concept may be selected based on the evaluations of the additional language models as well as the evaluation of the output of the first language model and second language model.

In some implementations, each language model uses classes sufficient to encompass each of various different manners of expressing a concept. For example, a general LOCATION class may cover all forms of expressing location, and thus be used as a set of classes representing a concept. However, a more specific STATE class may not be used to represent the concept, since it would not include common expressions of locations such as city names or airport names. As a result, the STATE class may be used a language model in combination with an AIRPORT class and a CITY class to permit the language model to have an appropriate class for each of the potential forms of expressing the concept. Sets of classes that encompass all possible expressions may be selected by, for example, examining the parse tree 250 and selecting a set of nodes so that each terminal node is either included or has a parent node included in the set. In some instances, every combination of classes that satisfies the criteria may be generated and tested.

In some implementations, language models may be generated and tested for different combinations of classes across multiple different concepts. For example, a first language model may use a class for a first format of expressing time and use another class for a first format of expressing location. The second language model may use a class for a second format of expressing time and use another class for expressing a second format of expressing location. Language models may be generated using each possible combination of the classes for the different concepts, allowing the computing system to determine which combinations of classes provide the best performance when used together.

In some instances, the computing system performs various iterations of testing, with new sets of language models being generated and tested at each iteration. Each iteration may be used to assess the best way to represent a single concept or small number of concepts. For example, in a first iteration, a first set of language models may be generated and tested, where the classes used to represent a first concept differ from one model to the next, but the classes used to represent other concepts are the same across the set of models. After testing, the classes that provide the best performance for the first concept are selected. A second set of language models may then be generated and tested, where the second language models each use the previously selected classes to represent the first concept, but use different classes to represent a second concept. In this manner, the computing system may assess the appropriate classes to use for multiple concepts, one concept or a few concepts at a time, by varying the classes corresponding to fewer than all of the concepts to be modeled in each iteration.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method performed by one or more computers, the method comprising:
   accessing data indicating a set of classes that each represent a different level of specificity of a same, particular semantic concept, wherein the classes respectively correspond to different types of words or phrases, and each class includes multiple words or phrases of the corresponding type for the class;
   identifying a language sequence including a particular word or phrase that corresponds to the particular semantic concept;
   generating a first modified language sequence by replacing the particular word or phrase with a symbol representing the first class;
   generating a second modified language sequence by replacing the particular word or phrase with a symbol representing at least one the second classes;
   generating a first language model in which a single first class from the set of classes represents the particular semantic concept, the first language model being trained using the first modified language sequence;
   generating a second language model in which multiple second classes from the set of classes represent the particular semantic concept at a greater level of specificity than the first class, each of the second classes being different from the first class, the second language model being trained using the second modified language sequence; and
   selecting the first class or the multiple second classes based on output of the first language model and output of the second language model.

2. The method of claim 1, wherein generating the first language model comprises generating the first language model using the first class to represent the particular semantic concept and without using any of the second classes to represent the particular semantic concept, the first language model being trained using the first modified language sequence and not using the second modified language sequence; and
   wherein generating the second language model comprises generating the second language model using the second classes to represent the particular semantic concept and without using the first class to represent the particular semantic concept, the second language model being trained using the second modified language sequence and not using the first modified language sequence.

3. The method of claim 1, further comprising:
   receiving audio data corresponding to an utterance; and
   based on selecting the first class or the multiple second classes, determining a transcription for the utterance using a language model in which either (i) the selected first class represents the particular semantic concept and the multiple second classes do not represent the particular semantic concept, or (ii) the selected multiple second classes represent the particular semantic concept and the first class does not represent the particular semantic concept.

4. The method of claim 3, wherein selecting the first class or the multiple second classes comprises selecting the first class; and
   wherein determining the transcription for the utterance using a language model in which the selected one or more classes represents the concept comprises using the first language model to determine the transcription for the utterance.

5. The method of claim 3, wherein selecting the first class or the multiple second classes comprises selecting the first class and not selecting the second classes; and
   wherein determining the transcription for the utterance using a language model in which the selected one or more classes represent the concept comprises using the first language model to determine the transcription for the utterance and not using the second language model to determine the transcription for the utterance.

6. The method of claim 3, wherein selecting the first class or the multiple second classes comprises selecting the first class; and
   wherein the method further comprises, based on selecting the first class, generating a third language model in which the first class from the set of classes represents the concept; and
   wherein using a language model in which the selected one or more classes represents the concept to determine a transcription for the utterance comprises using the third language model to determine the transcription.

7. The method of claim 1, further comprising:
   determining a first score based on the output of the first language model;
   determining a second score based on the output of the second language model; and
   comparing the first score and the second score, wherein selecting the first class or the multiple second classes is performed based on comparing the first score and the second score.

8. The method of claim 7, wherein determining the first score comprises determining a score that indicates a word error rate of the first language model; and
wherein determining the second score comprises determining a score that indicates a word error rate of the second language model.

9. The method of claim 7, wherein determining the first score comprises determining a score that indicates a perplexity of the first language model; and
determining the second score comprises determining a score that indicates a perplexity of the second language model.

10. The method of claim 1, wherein accessing data indicating the set of classes comprises accessing data indicating a hierarchy of classes corresponding to the particular semantic concept, wherein at least some of the classes in the hierarchy represent different forms of expressing at least a portion of the particular semantic concept.

11. The method of claim 10, wherein the hierarchy includes a top-level class, one or more lowest-level classes, and one or more intermediate classes located between the top-level class and the one or more lowest-level classes;
wherein selecting the first class or the multiple second classes comprises selecting one or more of the intermediate classes; and
wherein the method further comprises using a language model in which the selected one or more intermediate classes are used to represent the concept to determine a transcription for one or more utterances.

12. The method of claim 10, wherein the first class and the multiple second classes are located at different levels of the hierarchy, and the multiple second classes are sub-classes of the first class.

13. The method of claim 10, further comprising:
generating, for each additional set of classes in the hierarchy that represents the concept other than the first class and the multiple second classes, an additional language model in which the additional set of classes represents the concept;
obtaining output of each of the additional language models for the set of input data; and
evaluating the output of each of the additional language models;
selecting one or more of the classes in the hierarchy of classes based on evaluating the output of the first language model and the output of the second language model and based on evaluating the output of each of the additional language models.

14. The method of claim 1, further comprising identifying a transcription for an utterance;
wherein generating the first language model comprises training the first language model based on the transcription for the utterance, and wherein generating the second language model comprises training the second language model based on the transcription for the utterance.

15. A system comprising:
one or more computers; and
one or more storage devices storing instructions that are operable, when executed by the one or more computers, to cause the one or more computers to perform operations comprising:
accessing data indicating a set of classes that each represent a different level of specificity of a same, particular semantic concept, wherein the classes respectively correspond to different types of words or phrases, and each class includes multiple words or phrases of the corresponding type for the class;
identifying a language sequence including a particular word or phrase that corresponds to the particular semantic concept;
generating a first modified language sequence by replacing the particular word or phrase with a symbol representing the first class;
generating a second modified language sequence by replacing the particular word or phrase with a symbol representing at least one the second classes;
generating a first language model in which a single first class from the set of classes represents the particular semantic concept, the first language model being trained using the first modified language sequence;
generating a second language model in which multiple second classes from the set of classes represent the particular semantic concept at a greater level of specificity than the first class, each of the second classes being different from the first class, the second language model being trained using the second modified language sequence; and
selecting the first class or the multiple second classes based on output of the first language model and output of the second language model.

16. A non-transitory computer-readable storage device storing instructions that, when executed by a computer, cause the computer to perform operations comprising:
accessing data indicating a set of classes that each represent a different level of specificity of a same, particular semantic concept, wherein the classes respectively correspond to different types of words or phrases, and each class includes multiple words or phrases of the corresponding type for the class;
identifying a language sequence including a particular word or phrase that corresponds to the particular semantic concept;
generating a first modified language sequence by replacing the particular word or phrase with a symbol representing the first class;
generating a second modified language sequence by replacing the particular word or phrase with a symbol representing at least one the second classes;
generating a first language model in which a single first class from the set of classes represents the particular semantic concept, the first language model being trained using the first modified language sequence;
generating a second language model in which multiple second classes from the set of classes represent the particular semantic concept at a greater level of specificity than the first class, each of the second classes being different from the first class, the second language model being trained using the second modified language sequence; and
selecting the first class or the multiple second classes based on output of the first language model and output of the second language model.

17. The non-transitory computer-readable storage device of claim 16, wherein accessing data indicating the set of classes comprises accessing data indicating a hierarchy of classes representing the particular semantic concept at each of multiple different levels of specificity.

18. The non-transitory computer-readable storage device of claim 17, wherein the hierarchy includes a top-level class, one or more lowest-level classes, and multiple intermediate classes located between the top-level class and the one or more lowest-level classes, and wherein the multiple second classes are the multiple intermediate classes;

wherein selecting the first class or the multiple second classes comprises selecting the multiple intermediate classes; and wherein the method further comprises using a language model in which the selected multiple intermediate classes are used to represent the concept to determine a transcription for one or more utterances.

19. The non-transitory computer-readable storage device of claim 17, wherein the operations further comprise:

identifying, in a language sequence, a word or phrase corresponding to the particular semantic concept; and identifying, for the identified word or phrase, a subset of the classes in the hierarchy that includes classes at different levels of the hierarchy that that represent the semantic meaning of the identified word or phrase at different levels of specificity;

wherein generating the first language model comprises training the first language model based on the language sequence and one or more of the identified classes, and wherein generating the second language model comprises training the second language model based on the language sequence and one or more of the identified classes.

20. The non-transitory computer-readable storage device of claim 16, wherein generating the first language model comprises generating the first language model using the first class to represent the particular semantic concept and without using any of the second classes to represent the particular semantic concept, the first language model being trained using the first modified language sequence and not using the second modified language sequence; and wherein generating the second language model comprises generating the second language model using the second classes to represent the particular semantic concept and without using the first class to represent the particular semantic concept, the second language model being trained using the second modified language sequence and not using the first modified language sequence;

wherein selecting the first class or the multiple second classes comprises selecting the first class or the multiple second classes but not both the first class and the multiple second classes;

wherein the operations further comprise:

receiving audio data corresponding to an utterance; and based on selecting the first class or the multiple second classes, determining a transcription for the utterance using a language model in which either (i) the selected first class represents the particular semantic concept and the multiple second classes do not represent the particular semantic concept, or (ii) the selected multiple second classes represent the particular semantic concept and the first class does not represent the particular semantic concept.

* * * * *